United States Patent
Nakanishi et al.

(10) Patent No.: US 8,697,767 B2
(45) Date of Patent: Apr. 15, 2014

(54) PRODUCTION METHOD FOR PRESSURE-SENSITIVE ADHESIVE COMPOSITION

(71) Applicants: Tadatoshi Nakanishi, Ibaraki (JP); Eiichi Imoto, Ibaraki (JP)

(72) Inventors: Tadatoshi Nakanishi, Ibaraki (JP); Eiichi Imoto, Ibaraki (JP)

(73) Assignee: Nitto Denko Corporation, Osaka (JP)

( * ) Notice: Subject to any disclaimer, the term of this patent is extended or adjusted under 35 U.S.C. 154(b) by 0 days.

(21) Appl. No.: 13/633,624

(22) Filed: Oct. 2, 2012

(65) Prior Publication Data
US 2013/0085202 A1 Apr. 4, 2013

(30) Foreign Application Priority Data

Oct. 3, 2011 (JP) .................................. 2011-219051

(51) Int. Cl.
- *C08F 299/00* (2006.01)
- *C08G 18/67* (2006.01)
- *C08J 3/28* (2006.01)
- *C08F 2/46* (2006.01)
- *C08G 61/04* (2006.01)

(52) U.S. Cl.
USPC .................. 522/95; 522/90; 522/113; 522/1; 520/1

(58) Field of Classification Search
USPC ................................ 522/95, 90, 113, 1; 520/1
See application file for complete search history.

(56) References Cited

U.S. PATENT DOCUMENTS

| 7,976,952 B2 * | 7/2011 | Yoshida et al. ............ 428/423.7 |
| 8,389,629 B2 * | 3/2013 | Saito et al. .................... 525/101 |

FOREIGN PATENT DOCUMENTS

JP 4666715 B2 4/2011

* cited by examiner

*Primary Examiner* — Ling Choi
*Assistant Examiner* — Jessica E Whiteley
(74) *Attorney, Agent, or Firm* — Sughrue Mion, PLLC

(57) ABSTRACT

Provided is a production method for a pressure-sensitive adhesive composition capable of sufficiently expressing each of "attachment position correction workability" that enables a pressure-sensitive adhesive tape containing the composition to be easily aligned by the expression of good temporary attachment property, "reworkability" that enables the tape to be easily reattached, and "temperature-sensitive strong pressure-sensitive adhesiveness" that enables the tape to express strong temperature-sensitive pressure-sensitive adhesiveness. The production method for a pressure-sensitive adhesive composition is a production method for a pressure-sensitive adhesive composition containing a cross-linked polymer in which an acrylic copolymer (A) is cross-linked by a polyurethane(meth)acrylate (B), the method including irradiating a monomer mixed liquid essentially containing a (meth)acrylate and a (meth)acrylamide with an active energy ray in the presence of the polyurethane(meth)acrylate (B).

6 Claims, No Drawings

PRODUCTION METHOD FOR PRESSURE-SENSITIVE ADHESIVE COMPOSITION

CROSS REFERENCE TO RELATED APPLICATIONS

This application claims priority based on Japanese Patent Application No. 2011-219051 filed Oct. 3, 2011, the contents of which are incorporated herein by reference in their entirety.

BACKGROUND OF THE INVENTION

1. Field of the Invention

The present invention relates to a production method for a pressure-sensitive adhesive composition.

2. Description of the Related Art

When a pressure-sensitive adhesive tape is attached to any one of the various adherends, the pressure-sensitive adhesive tape is required to be easily and strongly attached to a predetermined position of the adherend. Accordingly, the pressure-sensitive adhesive tape is required to bring together "attachment position correction workability" that enables the tape to be easily aligned by expression of good temporary attachment property and "reworkability" that enables the tape to be easily reattached in a balanced manner. Further, in recent years, the tape has started to be required to have "temperature-sensitive strong pressure-sensitive adhesiveness" that enables the tape to express strong temperature-sensitive pressure-sensitive adhesiveness so as to be applied to, for example, a small cell-related application or an electronic equipment application. A hot melt-type pressure-sensitive adhesive using a thermoplastic resin has been conventionally known as a pressure-sensitive adhesive having the "temperature-sensitive strong pressure-sensitive adhesiveness." However, the hot melt-type pressure-sensitive adhesive cannot maintain its film shape without a base material and hence it is difficult to apply the adhesive to, for example, abase material-less double-coated tape.

A pressure-sensitive adhesive composition containing an acrylic copolymer and a polyurethane(meth)acrylate has been recently reported as a pressure-sensitive adhesive composition capable of expressing high blistering resistance under a high-temperature environment (Japanese Patent No. 4666715).

The pressure-sensitive adhesive composition reported in Japanese Patent No. 4666715 is obtained by: mixing the acrylic copolymer obtained by radical polymerization and the polyurethane(meth)acrylate obtained by thermal polymerization with an additive; and applying the mixture onto a base material.

The pressure-sensitive adhesive composition reported in Japanese Patent No. 4666715 can express high blistering resistance under a high-temperature environment to some extent, but involves the following problem. The composition cannot sufficiently express the "attachment position correction workability" that enables a pressure-sensitive adhesive tape containing the composition to be easily aligned by expression of good temporary attachment property, the "reworkability" that enables the tape to be easily reattached, and the "temperature-sensitive strong pressure-sensitive adhesiveness" that enables the tape to express strong temperature-sensitive pressure-sensitive adhesiveness.

SUMMARY OF THE INVENTION

An object of the present invention is to provide a production method for a pressure-sensitive adhesive composition capable of sufficiently expressing each of "attachment position correction workability" that enables a pressure-sensitive adhesive tape containing the composition to be easily aligned by the expression of good temporary attachment property, "reworkability" that enables the tape to be easily reattached, and "temperature-sensitive strong pressure-sensitive adhesiveness" that enables the tape to express strong temperature-sensitive pressure-sensitive adhesiveness.

A production method for a pressure-sensitive adhesive composition according to the present invention is a production method for a pressure-sensitive adhesive composition containing a cross-linked polymer in which an acrylic copolymer (A) is cross-linked by a polyurethane(meth)acrylate (B), the method including irradiating a monomer mixed liquid essentially containing a (meth)acrylate and a (meth)acrylamide with an active energy ray in the presence of the polyurethane(meth)acrylate (B).

In a preferred embodiment, a weight ratio "(a):(b)" between a weight of raw materials for the acrylic copolymer (A) and a weight of raw materials for the polyurethane(meth)acrylate (B) is 20:80 to 80:20.

In a preferred embodiment, the monomer mixed liquid contains a photopolymerization initiator and the active energy ray includes UV light.

In a preferred embodiment, the polyurethane(meth)acrylate (B) includes a polymer obtained by causing a hydroxyl group-containing acrylic monomer to react with a polyurethane prepolymer obtained by a reaction between a polyol compound and a polyisocyanate compound.

In a preferred embodiment, a molar ratio between the polyol compound and the polyisocyanate compound is 1:1.1 to 1:1.5.

In a preferred embodiment, a molar ratio between the polyol compound and the hydroxyl group-containing acrylic monomer is 1:0.1 to 1:0.5.

In a preferred embodiment, the pressure-sensitive adhesive composition of the present invention is formed on a base material.

In a preferred embodiment, the base material includes a peelable base material and the pressure-sensitive adhesive composition is produced so as to be of a base material-less film shape by peeling the peelable base material after the formation on the peelable base material.

According to the present invention, it is possible to provide the production method for a pressure-sensitive adhesive composition capable of sufficiently expressing each of "attachment position correction workability" that enables a pressure-sensitive adhesive tape containing the composition to be easily aligned by the expression of good temporary attachment property, "reworkability" that enables the tape to be easily reattached, and "temperature-sensitive strong pressure-sensitive adhesiveness" that enables the tape to express strong temperature-sensitive pressure-sensitive adhesiveness.

To produce a pressure-sensitive adhesive composition that sufficiently expresses each of the "attachment position correction workability," the "reworkability," and the "temperature-sensitive strong pressure-sensitive adhesiveness," the inventors of the present invention have considered that a production method for the following pressure-sensitive adhesive composition needs to be found. At around room temperature, the composition expresses such an adhesion as to be capable of expressing good "attachment position correction workability" and good "reworkability," and when the temperature reaches a certain value, its modulus of elasticity abruptly reduces and its wettability against an adherend improves, and hence the composition can express good "temperature-sensitive strong pressure-sensitive adhesiveness." Further, the inventors of the present invention have considered that technological means for enabling the pressure-sensitive adhesive composition to be obtained to maintain its film shape at least at around room temperature without a base material needs to be found for applying the composition to a base material-less double-coated tape or the like.

As a result, the inventors of the present invention have first conducted an investigation on a polymer in which an acrylic copolymer (A) contains a polyurethane(meth)acrylate (B) and have found the following. When the acrylic copolymer (A) is cross-linked by the polyurethane(meth)acrylate (B), at low temperature, the molecular motion of the polymer is effectively suppressed by a strong urethane hydrogen bond and hence the modulus of elasticity of the entirety of the polymer increases. At around room temperature, the polymer can express such an adhesion as to be capable of expressing good "attachment position correction workability" and good "reworkability." On the other hand, as the temperature increases, the entirety of the polymer effectively softens and its modulus of elasticity abruptly reduces, and hence its wettability against an adherend improves. The inventors have also found that when such polymer is used in a pressure-sensitive adhesive composition, the composition can maintain its film shape at least at around room temperature without a base material.

Further, the inventors of the present invention have found that the adoption of a copolymer of monomers essentially containing a (meth)acrylate and a (meth)acrylamide as the acrylic copolymer (A) enables the composition to express good "temperature-sensitive strong pressure-sensitive adhesiveness" by virtue of an amide group. As in the urethane hydrogen bond, a hydrogen bond of the amide group contributes to the suppression of the molecular motion of the polymer at low temperature. However, the hydrogen-bonding capacity of the amide group differs from the hydrogen-bonding capacity of a urethane group. Accordingly, it is assumed that when the amide group dissociates from a hydrogen bond as a result of a temperature increase, the group interacts with, for example, a functional group present on the surface of an adherend and hence the composition can express strong pressure-sensitive adhesiveness.

In view of the foregoing, the inventors of the present invention have conceived a production method including irradiating a monomer mixed liquid essentially containing the (meth)acrylate and the (meth)acrylamide with an active energy ray in the presence of the polyurethane(meth)acrylate (B). The inventors of the present invention have found the following. According to the production method, the acrylic copolymer (A) is cross-linked by the polyurethane(meth)acrylate (B) and hence the pressure-sensitive adhesive composition to be obtained can express good "attachment position correction workability" and good "reworkability" at around room temperature. On the other hand, as the temperature increases, the entirety of the polymer effectively softens and its modulus of elasticity abruptly reduces, and hence its wettability against an adherend improves. Moreover, the pressure-sensitive adhesive composition can maintain its film shape without a base material. Further, an amide group can be present in the pressure-sensitive adhesive composition and hence the composition can express good "temperature-sensitive strong pressure-sensitive adhesiveness."

DETAILED DESCRIPTION OF THE PREFERRED EMBODIMENTS

As used herein, the term "(meth)acryl" means an acryl and/or a methacryl, the term "(meth)acrylate" means an acrylate and/or a methacrylate, and the term "(meth)acryloyl" means an acryloyl and/or a methacryloyl.

<<1. Production Method for Pressure-Sensitive Adhesive Composition>>

A production method for a pressure-sensitive adhesive composition according to the present invention is a production method for a pressure-sensitive adhesive composition containing a cross-linked polymer in which an acrylic copolymer (A) is cross-linked by a polyurethane(meth)acrylate (B).

The production method for a pressure-sensitive adhesive composition according to the present invention includes irradiating a monomer mixed liquid essentially containing a (meth)acrylate and a (meth)acrylamide with an active energy ray in the presence of the polyurethane(meth)acrylate (B).

The content of the (meth)acrylate in the monomer mixed liquid essentially containing the (meth)acrylate and the (meth)acrylamide is preferably 50 to 99 wt %, more preferably 60 to 97 wt %, still more preferably 70 to 95 wt %, particularly preferably 80 to 92 wt %. When the content of the (meth)acrylate in the monomer mixed liquid essentially containing the (meth)acrylate and the (meth)acrylamide falls within the range, the pressure-sensitive adhesive composition obtained by the production method of the present invention can express, in an additionally sufficiently manner, each of the "attachment position correction workability" that enables a pressure-sensitive adhesive tape containing the composition to be easily aligned by the expression of good temporary attachment property, the "reworkability" that enables the tape to be easily reattached, and the "temperature-sensitive strong pressure-sensitive adhesiveness" that enables the tape to express strong temperature-sensitive pressure-sensitive adhesiveness.

The content of the (meth)acrylamide in the monomer mixed liquid essentially containing the (meth)acrylate and the (meth)acrylamide is preferably 1 to 50 wt %, more preferably 3 to 40 wt %, still more preferably 5 to 30 wt %, particularly preferably 8 to 20 wt %. When the content of the (meth)acrylamide in the monomer mixture essentially containing the (meth)acrylate and the (meth)acrylamide falls within the range, the pressure-sensitive adhesive composition obtained by the production method of the present invention can express, in an additionally sufficiently manner, each of the "attachment position correction workability" that enables a pressure-sensitive adhesive tape containing the composition to be easily aligned by the expression of good temporary attachment property, the "reworkability" that enables the tape to be easily reattached, and the "temperature-sensitive strong pressure-sensitive adhesiveness" that enables the tape to express strong temperature-sensitive pressure-sensitive adhesiveness.

Examples of the (meth)acrylate include alkyl(meth)acrylates each having an alkyl group having 1 to 18 carbon atoms such as methyl(meth)acrylate, ethyl(meth)acrylate, propyl(meth)acrylate, butyl(meth)acrylate, amyl(meth)acrylate, hexyl(meth)acrylate, heptyl(meth)acrylate, 2-ethylhexyl(meth)acrylate, octyl(meth)acrylate, decyl(meth)acrylate, and lauryl(meth)acrylate.

The (meth)acrylates may be used alone or in combination.

Examples of the (meth)acrylamide include: monosubstituted (meth)acrylamides such as N-methylol(meth)acrylamide, N-isopropyl(meth)acrylamide, N-n-butoxymethyl (meth)acrylamide, N-(1,1-dimethyl-3-oxobutyl)(meth)acrylamide, and N,N-dimethylaminopropyl(meth)acrylamide; and N—N-disubstituted acrylamides such as N,N-dimethyl(meth)acrylamide, N,N-diethyl(meth)acrylamide, N,N-di-n-propyl(meth)acrylamide, N,N-diallyl(meth)

acrylamide, N,N-di-isopropyl(meth)acrylamide, N,N-di-n-butyl(meth)acrylamide, N,N-ethylmethyl(meth)acrylamide, N-(meth)acryloylmorpholine, N-(meth)acryloylpyrrolidone, N-(meth)acryloylpiperidine, N-(meth)acryloylpyrrolidine, and N-(meth)acryloylaziridine.

Of the exemplified compounds, the N,N-disubstituted acrylamide is preferred as the (meth)acrylamide. When the N,N-disubstituted acrylamide is used as the (meth)acrylamide, the pressure-sensitive adhesive composition obtained by the production method of the present invention can express, in an additionally sufficiently manner, each of the "attachment position correction workability" that enables a pressure-sensitive adhesive tape containing the composition to be easily aligned by the expression of good temporary attachment property, the "reworkability" that enables the tape to be easily reattached, and the "temperature-sensitive strong pressure-sensitive adhesiveness" that enables the tape to express strong temperature-sensitive pressure-sensitive adhesiveness.

The (meth)acrylamides may be used alone or in combination.

Any other monomer may be incorporated into the monomer mixture essentially containing the (meth)acrylate and the (meth)acrylamide as required. The content of the other monomer in the monomers essentially containing the (meth)acrylate and the (meth)acrylamide can be appropriately set depending on purposes. The content of the other monomer in the monomer mixture essentially containing the (meth)acrylate and the (meth)acrylamide is preferably 20 wt % or less, more preferably 10 wt % or less.

Examples of the other monomer include: carboxyl group-containing monomers such as (meth)acrylic acid, crotonic acid, maleic acid, fumaric acid, and itaconic acid; hydroxyl group-containing monomers such as 2-hydroxyethyl(meth)acrylate, 2-hydroxypropyl(meth)acrylate, 4-hydroxybutyl(meth)acrylate, and allyl alcohol; tertiary amino group-containing monomers such as dimethylaminoethyl(meth)acrylate, diethylaminoethyl(meth)acrylate, and dimethylaminopropyl(meth)acrylate; and epoxy group-containing monomers such as glycidyl methacrylate.

The polyurethane(meth)acrylate (B) is a compound having two or more acryloyl groups or methacryloyl groups per molecule and having a urethane bond in a repeating structural unit.

The polyurethane(meth)acrylate (B) is preferably a polymer obtained by causing a hydroxyl group-containing acrylic monomer to react with a polyurethane prepolymer obtained by a reaction between a polyol compound and a polyisocyanate compound.

Examples of the polyol compound include a polyester polyol, a polyether polyol, a polyacrylate polyol, a polycarbonate polyol, a polyolefin polyol, a polybutadiene polyol and a hydrogenated product thereof, a polyisoprene polyol and a hydrogenated product thereof, a phenolic polyol, an epoxypolyol, and a polysulfone polyol. Further, a polyol copolymer such as a polyester-polyether polyol may be used as the polyol compound.

Of the exemplified compounds, a polycarbonate diol is preferred as the polyol compound.

The polyol compounds may be used alone or in combination.

Examples of the polyisocyanate compound include hexamethylene diisocyanate, diphenylmethane diisocyanate, tolylene diisocyanate, isophorone diisocyanate, dicyclohexylmethane diisocyanate, tetramethylxylene diisocyanate, xylylene diisocyanate, naphthalene diisocyanate, trimethylhexamethylene diisocyanate, tolidine diisocyanate, p-phenylene diisocyanate, cyclohexylene diisocyanate, methylenebis(4-phenylmethane)diisocyanate, hexamethylene diisocyanate, dimer acid diisocyanate, hydrogenated tolylene diisocyanate, hydrogenated xylylene diisocyanate, lysine diisocyanate, triphenylmethane triisocyanate, and tri(isocyanatophenyl)triphosphate.

Of the exemplified compounds, hydrogenated xylylene diisocyanate is preferred as the polyisocyanate compound.

The polyisocyanate compounds may be used alone or in combination.

The polyurethane prepolymer is preferably obtained by a reaction between the polyol compound and the polyisocyanate compound. In addition, the prepolymer preferably contains an isocyanate residue for later introduction of the hydroxyl group-containing acrylic monomer. Specifically, for example, it is preferred that the polyurethane prepolymer be obtained by mixing and stirring the polyol compound and the polyisocyanate compound, and the polyisocyanate compound be added so that an isocyanate group may be excessive with respect to a hydroxyl group in the polyol compound. In addition, the reaction can be performed by adding an organic solvent free of active hydrogen with which an isocyanate group can react (e.g., ethyl acetate, methyl ethyl ketone, or chloroform) and a catalyst (e.g., any one of organometallic catalysts such as a tin chloride and an organotin compound, organic bases such as a tertiary amine compound, and organic acids such as acetic acid and acrylic acid) as required.

With regard to a ratio between the polyol compound and the polyisocyanate compound, the compounds are preferably compounded at a molar ratio "polyol compound:polyisocyanate compound" of 1:1.01 to 1:2.0, and are more preferably compounded at a molar ratio "polyol compound:polyisocyanate compound" of 1:1.1 to 1:1.5 in order that the prepolymer may contain an isocyanate residue for the later introduction of the hydroxyl group-containing acrylic monomer. When the ratio between the polyol compound and the polyisocyanate compound falls within the range, the pressure-sensitive adhesive composition obtained by the production method of the present invention can express, in an additionally sufficiently manner, each of the "attachment position correction workability" that enables a pressure-sensitive adhesive tape containing the composition to be easily aligned by the expression of good temporary attachment property, the "reworkability" that enables the tape to be easily reattached, and the "temperature-sensitive strong pressure-sensitive adhesiveness" that enables the tape to express strong temperature-sensitive pressure-sensitive adhesiveness.

The polyurethane(meth)acrylate (B) is preferably obtained by causing the hydroxyl group-containing acrylic monomer to react with the polyurethane prepolymer. In addition, the reaction can be performed by adding an organic solvent free of active hydrogen with which an isocyanate group can react (e.g., ethyl acetate, methyl ethyl ketone, or chloroform) and a catalyst (e.g., any one of organometallic catalysts such as a tin chloride and an organotin compound, organic bases such as a tertiary amine compound, and organic acids such as acetic acid and acrylic acid) as required.

Examples of the hydroxyl group-containing acrylic monomer include 2-hydroxyethyl(meth)acrylate, 2-hydroxypropyl(meth)acrylate, 4-hydroxybutyl(meth)acrylate, (4-hydroxymethylcyclohexyl)methyl(meth)acrylate, 2-hydroxy-3-phenyloxypropyl(meth)acrylate, neopentyl glycol mono(meth)acrylate, trimethylolpropane di(meth)acrylate, and pentaerythritol tri(meth)acrylate.

The hydroxyl group-containing acrylic monomer is preferably added to the polyurethane prepolymer compound at such a ratio that the amount of the hydroxyl group in the hydroxyl group-containing acrylic monomer is equivalent to the amount of the isocyanate residue of the polyurethane prepolymer. Specifically, a molar ratio "polyol compound: hydroxyl group-containing acrylic monomer" of the hydroxyl group-containing acrylic monomer to the polyol compound compounded in the synthesis of the polyurethane prepolymer is preferably 1:0.08 to 1:0.5, and the molar ratio "polyol compound:hydroxyl group-containing acrylic monomer" is more preferably 1:0.1 to 1:0.4. When the ratio between the polyol compound and the hydroxyl group-containing acrylic monomer falls within the range, the pressure-sensitive adhesive composition obtained by the production method of the present invention can express, in an additionally sufficiently manner, each of the "attachment position correction workability" that enables a pressure-sensitive adhesive tape containing the composition to be easily aligned by the expression of good temporary attachment property, the "reworkability" that enables the tape to be easily reattached, and the "temperature-sensitive strong pressure-sensitive adhesiveness" that enables the tape to express strong temperature-sensitive pressure-sensitive adhesiveness.

The molecular weight of the polyurethane(meth)acrylate (B) can be appropriately set depending on purposes. However, when the molecular weight is excessively high, the polyurethane(meth)acrylate is apt to crystallize at around room temperature and hence it may be difficult to obtain the pressure-sensitive adhesive composition as a uniform cross-linked product. Accordingly, the molecular weight of the polyurethane(meth)acrylate (B) is, for example, preferably 10,000 or less, more preferably 5,000 or less, still more preferably 3,000 or less, particularly preferably 2,000 or less.

The acrylic copolymer (A) is produced by a copolymerization reaction of the monomer mixture essentially containing the (meth)acrylate and the (meth)acrylamide.

In the production method for a pressure-sensitive adhesive composition according to the present invention, a weight ratio "(a):(b)" between the weight of the raw materials for the acrylic copolymer (A) and the weight of the raw materials for the polyurethane(meth)acrylate (B) is preferably 20:80 to 80:20, more preferably 25:75 to 75:25, still more preferably 30:70 to 70:30. When the ratio between the weight of the raw materials for the acrylic copolymer (A) and the weight of the raw materials for the polyurethane(meth)acrylate (B) falls within the range, the pressure-sensitive adhesive composition obtained by the production method of the present invention can express, in an additionally sufficiently manner, each of the "attachment position correction workability" that enables a pressure-sensitive adhesive tape containing the composition to be easily aligned by the expression of good temporary attachment property, the "reworkability" that enables the tape to be easily reattached, and the "temperature-sensitive strong pressure-sensitive adhesiveness" that enables the tape to express strong temperature-sensitive pressure-sensitive adhesiveness.

The monomer mixed liquid preferably contains a photopolymerization initiator. The active energy ray is preferably UV light.

Examples of the photopolymerization initiator include: low-molecular-weight polymerization initiators such as acetophenone, 2,2-diethoxybenzophenone, 4-methylbenzophenone, 2,4,6-trimethylbenzophenone, Michler's ketone, benzoin, benzoin methyl ether, benzoin ethyl ether, benzoin isopropyl ether, benzoin isobutyl ether, benzyl diphenyl sulfide, tetramethylthiuram monosulfide, benzyl dimethyl ketal, dibenzyl, diacetyl, 1-chloroanthraquinone, 2-chloroanthraquinone, 2-ethylanthraquinone, 2,2-dimethoxy-1,2-diphenylethan-1-one, 1-hydroxycyclohexyl phenyl ketone, 2-methyl-1-[4-(methylthio)phenyl]-2-morpholinopropanone-1,2-benzyl-2-dimethylamino-1-(4-morpholinophenyl)-butanone-1,2-hydroxy-2-methyl-1-phenyl-1-propanone, diethylthioxanthone, isopropylthioxanthone, and 2,4,6-trimethylbenzyldiphenyl-phosphine oxide; and oligomerized polymerization initiators such as oligo{2-hydroxy-2-methyl-1-[4-(1-methylvinyl)phenyl]propanone.

The photopolymerization initiators may be used alone or in combination.

Any appropriate amount to be typically used in photopolymerization can be adopted as the content of the photopolymerization initiator.

Any appropriate condition that can be generally adopted for polymerization through irradiation with the active energy ray can be adopted as a reaction condition during the irradiation of the monomer mixed liquid essentially containing the (meth)acrylate and the (meth)acrylamide with the active energy ray in the presence of the polyurethane(meth)acrylate (B) in the production method for a pressure-sensitive adhesive composition according to the present invention.

In the production method for a pressure-sensitive adhesive composition according to the present invention, UV light polymerization is performed by irradiating the monomer mixed liquid essentially containing the (meth)acrylate and the (meth)acrylamide with UV light in the presence of the polyurethane(meth)acrylate (B) and preferably in the presence of the photopolymerization initiator.

Through such reaction, the acrylic copolymer (A) is produced by the UV light polymerization of the monomer mixture essentially containing the (meth)acrylate and the (meth)acrylamide. In addition, the polyurethane(meth)acrylate having (meth)acryloyl groups at both of its terminals serves as a cross-linking agent to form a cross-linked polymer in which the acrylic copolymer (A) is cross-linked by the polyurethane(meth)acrylate (B), preferably a cross-linked polymer in which a polymer skeleton (a) derived from the acrylic copolymer (A) is cross-linked through a polymer skeleton (b) derived from the polyurethane(meth)acrylate (B).

In the production method for a pressure-sensitive adhesive composition according to the present invention, the monomer mixed liquid may contain any appropriate additive as required. Examples of such additive include a UV absorbing agent, a softening agent (plasticizer), a filler, an antioxidant, a tackifier, a pigment, a dye, and a silane coupling agent.

In the production method for a pressure-sensitive adhesive composition according to the present invention, the pressure-sensitive adhesive composition can be formed on any appropriate base material.

Examples of the base material include: organic materials such as a polyolefin resin, a polycarbonate resin, a (meth) acrylic resin, a polyester resin, a norbornene resin, and a polystyrene resin; and inorganic materials such as glass.

When a peelable base material is used as the base material, the pressure-sensitive adhesive composition can be formed on the peelable base material by producing the pressure-sensitive adhesive composition on the peelable base material, and thereafter, a pressure-sensitive adhesive composition of a base material-less film shape can be obtained by peeling the peelable base material. Thus, the pressure-sensitive adhesive composition obtained by the production method of the present invention can maintain its film shape at least at around room temperature (e.g., 25° C.) without a base material.

The thickness of the pressure-sensitive adhesive composition of a base material-less film shape thus obtained is preferably 0.1 to 1,000 µm, more preferably 1 to 500 µm, still more preferably to 100 µm, particularly preferably 10 to 80 µm. The pressure-sensitive adhesive composition of such a thin, base material-less film shape is applicable to various applications because of the following feature. The composition can be turned into a pressure-sensitive adhesive tape that is thin and free of any base material.

<<2. Pressure-Sensitive Adhesive Composition>>

The pressure-sensitive adhesive composition obtained by the production method of the present invention is a pressure-sensitive adhesive composition containing a cross-linked polymer in which an acrylic copolymer (A) is cross-linked by a polyurethane(meth)acrylate (B).

Any appropriate content can be adopted as the content of the cross-linked polymer in the pressure-sensitive adhesive composition obtained by the production method of the present invention depending on applications. The content of the cross-linked polymer in the pressure-sensitive adhesive composition obtained by the production method of the present invention is preferably 50 to 100 wt %, more preferably 70 to 100 wt %, still more preferably 90 to 100 wt %, particularly preferably 95 to 100 wt %.

The cross-linked polymer is preferably a cross-linked polymer in which a polymer skeleton (a) derived from the acrylic copolymer (A) is cross-linked through a polymer skeleton (b) derived from the polyurethane(meth)acrylate (B).

With regard to such cross-linked structure as described above, any appropriate method can be adopted as a method of identifying the structure. Such structure-identifying method may be a method involving directly identifying the cross-linked structure, or may be a method involving indirectly identifying the cross-linked structure with proof showing the presence of the structure.

In general, a polymer is an aggregate of a plurality of polymer molecules having the same molecular weight or different molecular weights. Accordingly, the acrylic copolymer (A) is an aggregate of a plurality of polymer molecules and the polyurethane(meth)acrylate (B) is also an aggregate of a plurality of polymer molecules.

Therefore, the cross-linked polymer is such that the acrylic copolymer (A) as an aggregate of a plurality of polymer molecules is cross-linked by the polyurethane(meth)acrylate (B) as an aggregate of a plurality of polymer molecules and at least one of the plurality of polymer molecules of the acrylic copolymer (A) is cross-linked by at least one of the plurality of polymer molecules of the polyurethane(meth)acrylate (B). A cross-linking point constituting the cross-linking is a bonding point of any appropriate reaction site of at least one of the plurality of polymer molecules of the acrylic copolymer (A) and a terminal of at least one of the plurality of polymer molecules of the polyurethane(meth)acrylate (B).

In addition, the cross-linked polymer contains the plurality of polymer skeletons (a) derived from the acrylic copolymer (A) as an aggregate of a plurality of polymer molecules and the plurality of polymer skeletons (b) derived from the polyurethane(meth)acrylate (B) as an aggregate of a plurality of polymer molecules, and is such that at least one polymer skeleton (a) in the plurality of polymer skeletons (a) is cross-linked through at least one polymer skeleton (b) in the plurality of polymer skeletons (b). A cross-linking point constituting the cross-linking is a bonding point of any appropriate reaction site of the polymer skeleton (a) and a terminal of the polymer skeleton (b).

A weight ratio "(a):(b)" between the contents of the polymer skeleton (a) and the polymer skeleton (b) in the structure of the cross-linked polymer is preferably 20:80 to 80:20, more preferably 25:75 to 75:25, still more preferably 30:70 to 70:30. When the contents of the polymer skeleton (a) and the polymer skeleton (b) in the structure of the cross-linked polymer fall within the range, the pressure-sensitive adhesive composition obtained by the production method of the present invention can express, in an additionally sufficiently manner, each of the "attachment position correction workability" that enables a pressure-sensitive adhesive tape containing the composition to be easily aligned by the expression of good temporary attachment property, the "reworkability" that enables the tape to be easily reattached, and the "temperature-sensitive strong pressure-sensitive adhesiveness" that enables the tape to express strong temperature-sensitive pressure-sensitive adhesiveness. It should be noted that the contents of the polymer skeleton (a) and the polymer skeleton (b) in the structure of the cross-linked polymer can be calculated from a ratio between the weight of raw materials for the acrylic copolymer (A) and the weight of raw materials for the polyurethane(meth)acrylate (B), the acrylic copolymer and the polyurethane(meth)acrylate being used upon production of the cross-linked polymer.

<<3. Pressure-Sensitive Adhesive Tape>>

A pressure-sensitive adhesive tape can be constituted with a pressure-sensitive adhesive composition obtained by the production method of the present invention.

Such pressure-sensitive adhesive tape contains the pressure-sensitive adhesive composition obtained by the production method of the present invention, and hence can sufficiently express each of "attachment position correction workability" that enables the tape to be easily aligned by the expression of good temporary attachment property, "reworkability" that enables the tape to be easily reattached, and "temperature-sensitive strong pressure-sensitive adhesiveness" that enables the tape to express strong temperature-sensitive pressure-sensitive adhesiveness.

Such pressure-sensitive adhesive tape may be such that the pressure-sensitive adhesive composition obtained by the production method of the present invention is formed on the base material, or may be of a base material-less film shape.

When such pressure-sensitive adhesive tape is of a base material-less film shape, the tape can sufficiently express each of "attachment position correction workability" that enables the tape to be easily aligned by the expression of good temporary attachment property, "reworkability" that enables the tape to be easily reattached, and "temperature-sensitive strong pressure-sensitive adhesiveness" that enables the tape to express strong temperature-sensitive pressure-sensitive adhesiveness. The tape also can sufficiently express flexibility.

Hereinafter, the present invention is specifically described by way of examples. However, the present invention is by no means limited to these examples. The term "part(s)" means "part(s) by weight."

(Measurement of Ordinary-State Adhesion and Temperature-Sensitive Adhesion)

A sample was cut into a tape shape having a width of 10 mm and a length of 140 mm. After having been crimped onto each of various adherends (an SUS304BA plate, a PET film, and a glass plate) by one reciprocation of a 2-kgf roller, the tape was left at rest for 30 minutes in an ordinary state (23.0±3.0° C.). Then, the tape was peeled at a tensile angle of 180° and a peel rate of 300 mm/min. A load at the time of the peeling was measured with an angle-changeable peel tester with a heating stage.

The ordinary-state adhesion of the sample was measured while the temperature of the heating stage was not increased.

The temperature-sensitive adhesion of the sample at 60° C. was measured by performing the crimping and peeling of the sample on the heating stage with the temperature of the stage set to 60° C.

(Tensile Storage Modulus of Elasticity)

A tensile storage modulus of elasticity was measured with an ARES (manufactured by TA Instruments). A sample cut so as to have a width of 5.0 mm and a length of 60 mm was fixed to a FIXTURE FIBER/FILM S-8 RAD2 (manufactured by TA Instruments), and then the measurement was performed in a temperature region of −50° C. to 200° C. under the conditions of a rate of temperature increase of 5° C./min and a frequency of 1 Hz.

(Measurement of Tensile Strength)

The maximum load during the stretching of a sample cut so as to have a width of 10 mm and a length of 120 mm at 23.0±3.0° C., a tension speed of 300 mm/min, and a stretching ratio of 300% was measured with an "AG-IS" manufactured by Shimadzu Corporation.

Example 1

38.44 Grams of a polycarbonate diol (Nippolan 981, Mw=1,000, manufactured by Nippon Polyurethane Industry Co., Ltd.) and 9.33 g of hydrogenated xylene diisocyanate (Takenate 650, manufactured by Takeda Pharmaceutical Co., Ltd.) were added to a mixed liquid of 42.50 g of methyl acrylate, 5.00 g of N,N-dimethylacrylamide, and 2.50 g of acrylic acid, and then the mixture was stirred under heating at 65° C. for 4 hours or more under a nitrogen atmosphere. While the state was maintained, 2.23 g of 2-hydroxyethyl acrylate were added to the mixture and then the whole was stirred under heating for an additional one hour or more. 1.00 Gram of a photopolymerization initiator (IRGACURE 651, manufactured by BASF) was added to the resultant viscous liquid and then the liquid was applied onto a polyester release liner so as to have a thickness of 50 µm. After that, the applied liquid was irradiated with UV light (light source: metal halide lamp) for 1 minute. Thus, a pressure-sensitive adhesive composition (1) having a thickness of 50 µm was obtained.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

The pressure-sensitive adhesive composition (1) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (1) was subjected to various evaluations. Table 1 shows the results.

Example 2

A pressure-sensitive adhesive composition (2) having a thickness of 50 µm was obtained in the same manner as in Example 1 except that: the usage of the polycarbonate diol was changed to 40.43 g; the usage of the hydrogenated xylene diisocyanate was changed to 8.63 g; and the usage of 2-hydroxyethyl acrylate was changed to 0.94 g.

A molar ratio between the polycarbonate diol and the hydrogenated xylene diisocyanate was 0.081 mol:0.089 mol, i.e., the ratio was 1:1.1.

A molar ratio between the polycarbonate diol and 2-hydroxyethyl acrylate was 0.081 mol:0.008 mol, i.e., the ratio was 1:0.1.

The pressure-sensitive adhesive composition (2) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (2) was subjected to various evaluations. Table 1 shows the results.

Example 3

A pressure-sensitive adhesive composition (3) having a thickness of 50 µm was obtained in the same manner as in Example 1 except that: the usage of the polycarbonate diol was changed to 36.64 g; the usage of the hydrogenated xylene diisocyanate was changed to 9.96 g; and the usage of 2-hydroxyethyl acrylate was changed to 3.40 g.

A molar ratio between the polycarbonate diol and the hydrogenated xylene diisocyanate was 0.073 mol:0.103 mol, i.e., the ratio was 1:1.4.

A molar ratio between the polycarbonate diol and 2-hydroxyethyl acrylate was 0.073 mol:0.029 mol, i.e., the ratio was 1:0.4.

The pressure-sensitive adhesive composition (3) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (3) was subjected to various evaluations. Table 1 shows the results.

Example 4

23.06 Grams of a polycarbonate diol (Nippolan 981, Mw=1,000, manufactured by Nippon Polyurethane Industry Co., Ltd.) and 5.60 g of hydrogenated xylene diisocyanate (Takenate 650, manufactured by Takeda Pharmaceutical Co., Ltd.) were added to a mixed liquid of 59.25 g of methyl acrylate, 7.00 g of N,N-dimethylacrylamide, and 3.75 g of acrylic acid, and then the mixture was stirred under heating at 65° C. for 4 hours or more under a nitrogen atmosphere. While the state was maintained, 1.34 g of 2-hydroxyethyl acrylate were added to the mixture and then the whole was stirred under heating for an additional one hour or more. 1.40 Grams of a photopolymerization initiator (IRGACURE 651, manufactured by BASF) were added to the resultant viscous liquid and then the liquid was applied onto a polyester release liner so as to have a thickness of 50 µm. After that, the applied liquid was irradiated with UV light (light source: metal halide lamp) for 1 minute. Thus, a pressure-sensitive adhesive composition (4) having a thickness of 50 µm was obtained.

A molar ratio between the polycarbonate diol and the hydrogenated xylene diisocyanate was 0.046 mol:0.058 mol, i.e., the ratio was 1:1.25.

A molar ratio between the polycarbonate diol and 2-hydroxyethyl acrylate was 0.046 mol:0.012 mol, i.e., the ratio was 1:0.25.

The pressure-sensitive adhesive composition (4) was a pressure-sensitive adhesive composition containing a cross-linked polymer in which the polymer skeleton (a) derived from the acrylic copolymer (A) was cross-linked through the polymer skeleton (b) derived from the polyurethane(meth) acrylate (B), and a weight ratio "(a):(b)" between the contents of the polymer skeleton (a) and the polymer skeleton (b) in the structure of the cross-linked polymer was 70.00 g:30.00 g, i.e., 70:30.

The resultant pressure-sensitive adhesive composition (4) was subjected to various evaluations. Table 1 shows the results.

Example 5

30.75 Grams of a polycarbonate diol (Nippolan 981, Mw=1,000, manufactured by Nippon Polyurethane Industry Co., Ltd.) and 7.46 g of hydrogenated xylene diisocyanate (Takenate 650, manufactured by Takeda Pharmaceutical Co., Ltd.) were added to a mixed liquid of 51.00 g of methyl acrylate, 6.00 g of N,N-dimethylacrylamide, and 3.00 g of acrylic acid, and then the mixture was stirred under heating at 65° C. for 4 hours or more under a nitrogen atmosphere. While the state was maintained, 1.79 g of 2-hydroxyethyl acrylate were added to the mixture and then the whole was stirred under heating for an additional one hour or more. 1.20 Grams of a photopolymerization initiator (IRGACURE 651, manufactured by BASF) were added to the resultant viscous liquid and then the liquid was applied onto a polyester release liner so as to have a thickness of 50 μm. After that, the applied liquid was irradiated with UV light (light source: metal halide lamp) for 1 minute. Thus, a pressure-sensitive adhesive composition (5) having a thickness of 50 μm was obtained.

A molar ratio between the polycarbonate diol and the hydrogenated xylene diisocyanate was 0.062 mol:0.077 mol, i.e., the ratio was 1:1.25.

A molar ratio between the polycarbonate diol and 2-hydroxyethyl acrylate was 0.062 mol:0.015 mol, i.e., the ratio was 1:0.25.

The pressure-sensitive adhesive composition (5) was a pressure-sensitive adhesive composition containing a cross-linked polymer in which the polymer skeleton (a) derived from the acrylic copolymer (A) was cross-linked through the polymer skeleton (b) derived from the polyurethane(meth) acrylate (B), and a weight ratio "(a):(b)" between the contents of the polymer skeleton (a) and the polymer skeleton (b) in the structure of the cross-linked polymer was 60.00 g:40.00 g, i.e., 60:40.

The resultant pressure-sensitive adhesive composition (5) was subjected to various evaluations. Table 1 shows the results.

Example 6

46.13 Grams of a polycarbonate diol (Nippolan 981, Mw=1,000, manufactured by Nippon Polyurethane Industry Co., Ltd.) and 11.20 g of hydrogenated xylene diisocyanate (Takenate 650, manufactured by Takeda Pharmaceutical Co., Ltd.) were added to a mixed liquid of 34.00 g of methyl acrylate, 4.00 g of N,N-dimethylacrylamide, and 2.00 g of acrylic acid, and then the mixture was stirred under heating at 65° C. for 4 hours or more under a nitrogen atmosphere. While the state was maintained, 2.68 g of 2-hydroxyethyl acrylate were added to the mixture and then the whole was stirred under heating for an additional one hour or more. 0.80 Gram of a photopolymerization initiator (IRGACURE 651, manufactured by BASF) was added to the resultant viscous liquid and then the liquid was applied onto a polyester release liner so as to have a thickness of 50 μm. After that, the applied liquid was irradiated with UV light (light source: metal halide lamp) for 1 minute. Thus, a pressure-sensitive adhesive composition (6) having a thickness of 50 μm was obtained.

A molar ratio between the polycarbonate diol and the hydrogenated xylene diisocyanate was 0.092 mol:0.115 mol, i.e., the ratio was 1:1.25.

A molar ratio between the polycarbonate diol and 2-hydroxyethyl acrylate was 0.092 mol:0.023 mol, i.e., the ratio was 1:0.25.

The pressure-sensitive adhesive composition (6) was a pressure-sensitive adhesive composition containing a cross-linked polymer in which the polymer skeleton (a) derived from the acrylic copolymer (A) was cross-linked through the polymer skeleton (b) derived from the polyurethane(meth) acrylate (B), and a weight ratio "(a):(b)" between the contents of the polymer skeleton (a) and the polymer skeleton (b) in the structure of the cross-linked polymer was 40.00 g:60.00 g, i.e., 40:60.

The resultant pressure-sensitive adhesive composition (6) was subjected to various evaluations. Table 1 shows the results.

Example 7

53.82 Grams of a polycarbonate diol (Nippolan 981, Mw=1,000, manufactured by Nippon Polyurethane Industry Co., Ltd.) and 13.06 g of hydrogenated xylene diisocyanate (Takenate 650, manufactured by Takeda Pharmaceutical Co., Ltd.) were added to a mixed liquid of 25.50 g of methyl acrylate, 3.00 g of N,N-dimethylacrylamide, and 1.50 g of acrylic acid, and then the mixture was stirred under heating at 65° C. for 4 hours or more under a nitrogen atmosphere. While the state was maintained, 3.12 g of 2-hydroxyethyl acrylate were added to the mixture and then the whole was stirred under heating for an additional one hour or more. 0.6 Gram of a photopolymerization initiator (IRGACURE 651, manufactured by BASF) was added to the resultant viscous liquid and then the liquid was applied onto a polyester release liner so as to have a thickness of 50 μm. After that, the applied liquid was irradiated with UV light (light source: metal halide lamp) for 1 minute. Thus, a pressure-sensitive adhesive composition (7) having a thickness of 50 μm was obtained.

A molar ratio between the polycarbonate diol and the hydrogenated xylene diisocyanate was 0.108 mol:0.135 mol, i.e., the ratio was 1:1.25.

A molar ratio between the polycarbonate diol and 2-hydroxyethyl acrylate was 0.108 mol:0.027 mol, i.e., the ratio was 1:0.25.

The pressure-sensitive adhesive composition (7) was a pressure-sensitive adhesive composition containing a cross-linked polymer in which the polymer skeleton (a) derived from the acrylic copolymer (A) was cross-linked through the polymer skeleton (b) derived from the polyurethane(meth) acrylate (B), and a weight ratio "(a):(b)" between the contents of the polymer skeleton (a) and the polymer skeleton (b) in the structure of the cross-linked polymer was 30.00 g:70.00 g, i.e., 30:70.

The resultant pressure-sensitive adhesive composition (7) was subjected to various evaluations. Table 1 shows the results.

Example 8

A pressure-sensitive adhesive composition (8) having a thickness of 50 μm was obtained in the same manner as in Example 1 except that the 42.50 g of methyl acrylate were changed to 42.50 g of isobornyl acrylate.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

The pressure-sensitive adhesive composition (8) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (8) was subjected to various evaluations. Table 2 shows the results.

Example 9

A pressure-sensitive adhesive composition (9) having a thickness of 50 μm was obtained in the same manner as in Example 1 except that 42.50 g of methyl acrylate were changed to 42.50 g of t-butyl acrylate.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

The pressure-sensitive adhesive composition (9) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (9) was subjected to various evaluations. Table 2 shows the results.

Example 10

A pressure-sensitive adhesive composition (10) having a thickness of 50 μm was obtained in the same manner as in Example 1 except that 42.50 g of methyl acrylate were changed to 42.50 g of benzyl acrylate.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

The pressure-sensitive adhesive composition (10) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (10) was subjected to various evaluations. Table 2 shows the results.

Example 11

A pressure-sensitive adhesive composition (11) having a thickness of 50 μm was obtained in the same manner as in Example 1 except that 42.50 g of methyl acrylate were changed to 42.50 g of butyl acrylate.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

The pressure-sensitive adhesive composition (11) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (11) was subjected to various evaluations. Table 2 shows the results.

Example 12

A pressure-sensitive adhesive composition (12) having a thickness of 50 μm was obtained in the same manner as in Example 1 except that 42.50 g of methyl acrylate were changed to 42.50 g of 2-ethylhexyl acrylate.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

The pressure-sensitive adhesive composition (12) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (12) was subjected to various evaluations. Table 2 shows the results.

Example 13

A pressure-sensitive adhesive composition (13) having a thickness of 50 μm was obtained in the same manner as in Example 1 except that 5.00 g of N,N-dimethylacrylamide were changed to 5.00 g of N,N-diethylacrylamide.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

The pressure-sensitive adhesive composition (13) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (13) was subjected to various evaluations. Table 2 shows the results.

Example 14

A pressure-sensitive adhesive composition (14) having a thickness of 50 μm was obtained in the same manner as in Example 1 except that 5.00 g of N,N-dimethylacrylamide were changed to 5.00 g of N,N-diisopropylacrylamide.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

The pressure-sensitive adhesive composition (14) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (14) was subjected to various evaluations. Table 2 shows the results.

Example 15

A pressure-sensitive adhesive composition (15) having a thickness of 50 μm was obtained in the same manner as in Example 1 except that: 38.44 g of the polycarbonate diol (Nippolan 981, Mw=1,000, manufactured by Nippon Polyurethane Industry Co., Ltd.) were changed to 43.46 g of a polycarbonate diol (Nippolan 982, Mw=2,000, manufactured by Nippon Polyurethane Industry Co., Ltd.); the usage of the hydrogenated xylene diisocyanate was changed to 5.27 g; and the usage of 2-hydroxyethyl acrylate was changed to 1.26 g.

A molar ratio between the polycarbonate diol and the hydrogenated xylene diisocyanate was 0.043 mol:0.054 mol, i.e., the ratio was 1:1.25.

A molar ratio between the polycarbonate diol and 2-hydroxyethyl acrylate was 0.043 mol:0.011 mol, i.e., the ratio was 1:0.25.

The pressure-sensitive adhesive composition (15) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (15) was subjected to various evaluations. Table 3 shows the results.

Example 16

A pressure-sensitive adhesive composition (16) having a thickness of 50 μm was obtained in the same manner as in Example 1 except that: 38.44 g of the polycarbonate diol (Nippolan 981, Mw=1,000, manufactured by Nippon Polyurethane Industry Co., Ltd.) were changed to 38.44 g of a polycarbonate diol (DURANOL T4691, manufactured by Asahi Kasei Chemicals Corporation); the usage of the hydrogenated xylene diisocyanate was changed to 9.33 g; and the usage of 2-hydroxyethyl acrylate was changed to 2.23 g.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

The pressure-sensitive adhesive composition (16) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (16) was subjected to various evaluations. Table 3 shows the results.

Example 17

A pressure-sensitive adhesive composition (17) having a thickness of 50 μm was obtained in the same manner as in Example 1 except that: 38.44 g of the polycarbonate diol (Nippolan 981, Mw=1,000, manufactured by Nippon Polyurethane Industry Co., Ltd.) were changed to 38.44 g of a polycarbonate diol (DURANOL T4671, manufactured by Asahi Kasei Chemicals Corporation); the usage of the hydrogenated xylene diisocyanate was changed to 9.33 g; and the usage of 2-hydroxyethyl acrylate was changed to 2.23 g.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

The pressure-sensitive adhesive composition (17) was a pressure-sensitive adhesive composition containing a cross-linked polymer in which the polymer skeleton (a) derived from the acrylic copolymer (A) was cross-linked through the polymer skeleton (b) derived from the polyurethane(meth)acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (17) was subjected to various evaluations. Table 3 shows the results.

Example 18

A pressure-sensitive adhesive composition (18) having a thickness of 50 μm was obtained in the same manner as in Example 1 except that: 38.44 g of the polycarbonate diol (Nippolan 981, Mw=1,000, manufactured by Nippon Polyurethane Industry Co., Ltd.) were changed to 38.44 g of a polycarbonate diol (DURANOL T5651, manufactured by Asahi Kasei Chemicals Corporation); the usage of the hydrogenated xylene diisocyanate was changed to 9.33 g; and the usage of 2-hydroxyethyl acrylate was changed to 2.23 g.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

The pressure-sensitive adhesive composition (18) was a pressure-sensitive adhesive composition containing a cross-linked polymer in which the polymer skeleton (a) derived from the acrylic copolymer (A) was cross-linked through the polymer skeleton (b) derived from the polyurethane(meth) acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (18) was subjected to various evaluations. Table 3 shows the results.

Example 19

A pressure-sensitive adhesive composition (19) having a thickness of 50 μm was obtained in the same manner as in Example 1 except that: 38.44 g of the polycarbonate diol (Nippolan 981, Mw=1,000, manufactured by Nippon Polyurethane Industry Co., Ltd.) were changed to 34.18 g of a polytetramethylene ether glycol (PTMG 650, manufactured by Mitsubishi Chemical Corporation); the usage of the hydrogenated xylene diisocyanate was changed to 12.76 g; and the usage of 2-hydroxyethyl acrylate was changed to 3.05 g.

A molar ratio between the polytetramethylene ether glycol and the hydrogenated xylene diisocyanate was 0.105 mol: 0.131 mol, i.e., the ratio was 1:1.25.

A molar ratio between the polytetramethylene ether glycol and 2-hydroxyethyl acrylate was 0.105 mol:0.026 mol, i.e., the ratio was 1:0.25.

The pressure-sensitive adhesive composition (19) was a pressure-sensitive adhesive composition containing a cross-linked polymer in which the polymer skeleton (a) derived from the acrylic copolymer (A) was cross-linked through the polymer skeleton (b) derived from the polyurethane(meth) acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (19) was subjected to various evaluations. Table 3 shows the results.

Example 20

A pressure-sensitive adhesive composition (20) having a thickness of 50 μm was obtained in the same manner as in Example 1 except that: 38.44 g of the polycarbonate diol (Nippolan 981, Mw=1,000, manufactured by Nippon Polyurethane Industry Co., Ltd.) were changed to 45.30 g of a polytetramethylene ether glycol (PTMG 2900, manufactured by Mitsubishi Chemical Corporation); the usage of the hydrogenated xylene diisocyanate was changed to 3.79 g; and the usage of 2-hydroxyethyl acrylate was changed to 0.91 g.

A molar ratio between the polytetramethylene ether glycol and the hydrogenated xylene diisocyanate was 0.031 mol: 0.039 mol, i.e., the ratio was 1:1.25.

A molar ratio between the polytetramethylene ether glycol and 2-hydroxyethyl acrylate was 0.031 mol:0.008 mol, i.e., the ratio was 1:0.25.

The pressure-sensitive adhesive composition (20) was a pressure-sensitive adhesive composition containing a cross-linked polymer in which the polymer skeleton (a) derived from the acrylic copolymer (A) was cross-linked through the polymer skeleton (b) derived from the polyurethane(meth) acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (20) was subjected to various evaluations. Table 3 shows the results.

Example 21

A pressure-sensitive adhesive composition (21) having a thickness of 50 μm was obtained in the same manner as in Example 14 except that: the usage of the polycarbonate diol (Nippolan 981, Mw=1,000, manufactured by Nippon Polyurethane Industry Co., Ltd.) was changed to 40.69 g; 9.33 g of the hydrogenated xylene diisocyanate were changed to 8.54 g of hexamethylene diisocyanate; and the usage of 2-hydroxyethyl acrylate was changed to 0.77 g.

A molar ratio between the polycarbonate diol and the hydrogenated xylene diisocyanate was 0.081 mol:0.102 mol, i.e., the ratio was 1:1.25.

A molar ratio between the polycarbonate diol and 2-hydroxyethyl acrylate was 0.081 mol:0.021 mol, i.e., the ratio was 1:0.25.

The pressure-sensitive adhesive composition (21) was a pressure-sensitive adhesive composition containing a cross-linked polymer in which the polymer skeleton (a) derived from the acrylic copolymer (A) was cross-linked through the polymer skeleton (b) derived from the polyurethane(meth) acrylate (B), and a weight ratio "(a):(b)" between the contents of the polymer skeleton (a) and the polymer skeleton (b) in the structure of the cross-linked polymer was 50.00 g:50.00 g, i.e., 50:50.

The resultant pressure-sensitive adhesive composition (21) was subjected to various evaluations. Table 3 shows the results.

Comparative Example 1

A pressure-sensitive adhesive composition (C1) having a thickness of 50 μm was obtained in the same manner as in Example 1 except that: N,N-dimethylacrylamide was not used; and the usage of acrylic acid was changed to 7.50 g.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

A weight ratio between the contents of a polymer skeleton derived from the acrylic copolymer and a polymer skeleton derived from the polyurethane(meth)acrylate in the polymer components in the pressure-sensitive adhesive composition (C1) was 50.00 g:50.00 g, i.e., 50:50.

The resultant pressure-sensitive adhesive composition (C1) was subjected to various evaluations. Table 4 shows the results.

Comparative Example 2

A pressure-sensitive adhesive composition (C2) having a thickness of 50 μm was obtained in the same manner as in Example 1 except that the irradiation with UV light was not performed.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

The polymer components in the pressure-sensitive adhesive composition (C2) were in such a state that the acrylic copolymer and the polyurethane(meth)acrylate were merely mixed with each other.

The resultant pressure-sensitive adhesive composition (C2) was subjected to various evaluations. Table 4 shows the results.

Comparative Example 3

A pressure-sensitive adhesive composition (C3) having a thickness of 50 μm was obtained in the same manner as in Example 1 except that: methyl acrylate was not used; and the usage of N,N-dimethylacrylamide was changed to 47.5 g.

A molar ratio between the polycarbonate diol and the hydrogenated xylene diisocyanate was 0.077 mol:0.096 mol, i.e., the ratio was 1:1.25.

A molar ratio between the polycarbonate diol and 2-hydroxyethyl acrylate was 0.077 mol:0.019 mol, i.e., the ratio was 1:0.25.

A weight ratio between the contents of a polymer skeleton derived from the acrylic copolymer and a polymer skeleton derived from the polyurethane(meth)acrylate in the polymer components in the pressure-sensitive adhesive composition (C3) was 50.00 g:50.00 g, i.e., 50:50.

The resultant pressure-sensitive adhesive composition (C3) was subjected to various evaluations. Table 4 shows the results.

TABLE 1

|  | Example 1 | Example 2 | Example 3 | Example 4 | Example 5 | Example 6 | Example 7 |
|---|---|---|---|---|---|---|---|
| Heat-adherent film | (1) | (2) | (3) | (4) | (5) | (6) | (7) |
| Ordinary-state adhesion (for SUS plate) (N/10 mm) | 0.12 | 0.12 | 0.19 | 0.08 | 0.12 | 0.08 | 0.62 |
| Temperature-sensitive adhesion at 60° C. (for SUS plate) (N/10 mm) | 7.58 | 8.65 | 10.51 | 5.77 | 8.26 | 4.60 | 26.78 |
| Ordinary-state adhesion (for PET film) (N/10 mm) | 0.03 | 0.04 | 0.02 | 0.01 | 0.03 | 0.02 | 0.04 |
| Temperature-sensitive adhesion at 60° C. (for PET film) (N/10 mm) | 2.19 | 3.52 | 1.04 | 0.81 | 2.33 | 0.88 | 1.29 |
| Ordinary-state adhesion (for glass plate) (N/10 mm) | 0.32 | 0.23 | 0.41 | 0.42 | 0.4 | 0.4 | 0.48 |
| Temperature-sensitive adhesion at 60° C. (for glass plate) (N/10 mm) | 20.58 | 14.54 | 19.80 | 29.32 | 26.24 | 26.16 | 26.78 |
| Tensile storage modulus of elasticity (-50° C.) (Pa) | $1.76 \times 10^9$ | $6.68 \times 10^8$ | $1.32 \times 10^{10}$ | $3.25 \times 10^9$ | $2.38 \times 10^9$ | $1.29 \times 10^9$ | $2.21 \times 10^{10}$ |
| Tensile storage modulus of elasticity (60° C.) (Pa) | $1.28 \times 10^7$ | $4.34 \times 10^6$ | $5.21 \times 10^7$ | $2.00 \times 10^7$ | $1.72 \times 10^6$ | $1.55 \times 10^5$ | $1.98 \times 10^7$ |
| Tensile strength (MPa) | 28.1 | 19.5 | 35.6 | 34.5 | 28.3 | 23.4 | 19.3 |

TABLE 2

|  | Example 8 | Example 9 | Example 10 | Example 11 | Example 12 | Example 13 | Example 14 |
|---|---|---|---|---|---|---|---|
| Heat-adherent film | (8) | (9) | (10) | (11) | (12) | (13) | (14) |
| Ordinary-state adhesion (for SUS plate) (N/10 mm) | 0.04 | 0.21 | 0.24 | 0.08 | 0.12 | 0.23 | 0.21 |
| Temperature-sensitive adhesion at 60° C. (for SUS plate) (N/10 mm) | 0.08 | 0.91 | 2.38 | 0.17 | 0.39 | 14.54 | 13.27 |
| Ordinary-state adhesion (for PET film) (N/10 mm) | 0.01 | 0.02 | 0.03 | 0.01 | 0.01 | 0.03 | 0.02 |
| Temperature-sensitive adhesion at 60° C. (for PET film) (N/10 mm) | 0.02 | 0.07 | 0.26 | 0.02 | 0.03 | 2.33 | 1.44 |

TABLE 2-continued

| | Example 8 | Example 9 | Example 10 | Example 11 | Example 12 | Example 13 | Example 14 |
|---|---|---|---|---|---|---|---|
| Ordinary-state adhesion (for glass plate) (N/10 mm) | 0.21 | 0.28 | 0.32 | 0.32 | 0.19 | 0.32 | 0.34 |
| Temperature-sensitive adhesion at 60° C. (for glass plate) (N/10 mm) | 0.44 | 1.55 | 2.13 | 0.67 | 0.67 | 22.37 | 23.02 |
| Tensile storage modulus of elasticity (−50° C.) (Pa) | $5.54 \times 10^{11}$ | $4.39 \times 10^{10}$ | $2.78 \times 10^{10}$ | $9.12 \times 10^{9}$ | $6.54 \times 10^{9}$ | $2.12 \times 10^{9}$ | $4.43 \times 10^{10}$ |
| Tensile storage modulus of elasticity (60° C.) (Pa) | $3.43 \times 10^{7}$ | $6.12 \times 10^{6}$ | $5.47 \times 10^{5}$ | $1.12 \times 10^{7}$ | $1.11 \times 10^{6}$ | $1.09 \times 10^{6}$ | $1.27 \times 10^{7}$ |
| Tensile strength (MPa) | 45.3 | 39.9 | 21.2 | 11.3 | 16.4 | 24.8 | 29.6 |

TABLE 3

| | Example 15 | Example 16 | Example 17 | Example 18 | Example 19 | Example 20 | Example 21 |
|---|---|---|---|---|---|---|---|
| Heat-adherent film | (15) | (16) | (17) | (18) | (19) | (20) | (21) |
| Ordinary-state adhesion (for SUS plate) (N/10 mm) | 0.31 | 0.42 | 0.21 | 0.32 | 0.33 | 0.19 | 0.21 |
| Temperature-sensitive adhesion at 60° C. (for SUS plate) (N/10 mm) | 10.35 | 26.63 | 14.72 | 13.82 | 13.30 | 9.90 | 6.78 |
| Ordinary-state adhesion (for PET film) (N/10 mm) | 0.04 | 0.02 | 0.02 | 0.03 | 0.05 | 0.01 | 0.01 |
| Temperature-sensitive adhesion at 60° C. (for PET film) (N/10 mm) | 1.68 | 0.86 | 1.11 | 0.99 | 3.27 | 0.51 | 0.33 |
| Ordinary-state adhesion (for glass plate) (N/10 mm) | 0.28 | 0.19 | 0.21 | 0.21 | 0.34 | 0.21 | 0.32 |
| Temperature-sensitive adhesion at 60° C. (for glass plate) (N/10 mm) | 11.79 | 12.45 | 6.74 | 11.68 | 18.77 | 7.20 | 9.47 |
| Tensile storage modulus of elasticity (−50° C.) (Pa) | $2.21 \times 10^{10}$ | $2.32 \times 10^{10}$ | $1.98 \times 10^{9}$ | $1.12 \times 10^{10}$ | $2.09 \times 10^{9}$ | $2.33 \times 10^{9}$ | $1.34 \times 10^{9}$ |
| Tensile storage modulus of elasticity (60° C.) (Pa) | $3.21 \times 10^{7}$ | $1.87 \times 10^{7}$ | $1.33 \times 10^{7}$ | $3.47 \times 10^{6}$ | $5.36 \times 10^{6}$ | $4.99 \times 10^{6}$ | $5.43 \times 10^{7}$ |
| Tensile strength (MPa) | 27.3 | 18.6 | 11.5 | 22.3 | 19.8 | 20.8 | 22.9 |

TABLE 4

| | Comparative Example 1 | Comparative Example 2 | Comparative Example 3 |
|---|---|---|---|
| Film | (C1) | (C2) | (C3) |
| Ordinary-state adhesion (for SUS plate) (N/10 mm) | 0.01 | 3.21 | 0.02 |
| Temperature-sensitive adhesion at 60° C. (for SUS plate) (N/10 mm) | 0.01 | 3.60 | 0.02 |
| Ordinary-state adhesion (for PET film) (N/10 mm) | 0.01 | 1.21 | 0.01 |
| Temperature-sensitive adhesion at 60° C. (for PET film) (N/10 mm) | 0.01 | 1.32 | 0.01 |
| Ordinary-state adhesion (for glass plate) (N/10 mm) | 0.01 | 2.54 | 0.02 |
| Temperature-sensitive adhesion at 60° C. (for glass plate) (N/10 mm) | 0.01 | 2.54 | 0.02 |
| Tensile storage modulus of elasticity (−50° C.) (Pa) | $1.98 \times 10^{12}$ | $2.19 \times 10^{7}$ | $9.91 \times 10^{9}$ |
| Tensile storage modulus of elasticity (60° C.) (Pa) | $3.21 \times 10^{8}$ | $2.09 \times 10^{7}$ | $1.02 \times 10^{8}$ |
| Tensile strength (MPa) | 19.2 | Unmeasurable due to immediate rupture | 21.1 |

The pressure-sensitive adhesive composition obtained by the production method of the present invention and the pressure-sensitive adhesive tape obtained therefrom are applicable to, for example, a small cell-related application and an electronic equipment application.

What is claimed is:

1. A production method for a pressure-sensitive adhesive composition containing a cross-linked polymer in which an acrylic copolymer (A) is cross-linked by a polyurethane (meth)acrylate (B), the method comprising irradiating a monomer mixed liquid essentially containing a alkyl(meth)acrylate having an alkyl group having 1 to 18 carbon atoms and N,N-disubstituted acrylamide with an active energy ray in a presence of the polyurethane(meth)acrylate (B), wherein the amount of the alkyl(meth)acrylate in the monomer liquid is 50 to 99 wt %, and the amount of the N,N-disubstituted acrylamide in the monomer liquid is 1 to 50 wt %, wherein the polyurethane(meth)acrylate (B) comprises a polymer obtained by causing a hydroxyl group-containing acrylic monomer to react with a polyurethane prepolymer obtained by a reaction between a polyol compound and a polyisocyanate compound, and wherein a molar ratio between the polyol compound and the hydroxyl group-containing acrylic monomer is 1:0.1 to 1:0.5.

2. A production method according to claim 1, wherein a weight ratio "(a):(b)" between a weight of raw materials for the acrylic copolymer (A) and a weight of raw materials for the polyurethane(meth)acrylate (B) is 20:80 to 80:20.

3. A production method according to claim 1, wherein the monomer mixed liquid contains a photopolymerization initiator and the active energy ray comprises UV light.

4. A production method according to claim 1, wherein a molar ratio between the polyol compound and the polyisocyanate compound is 1:1.1 to 1:1.5.

5. A production method according to claim 1, wherein the pressure-sensitive adhesive composition is formed on a base material.

6. A production method according to claim 5, wherein the base material comprises a peelable base material and the pressure-sensitive adhesive composition is produced so as to be of a base material-less film shape by peeling the peelable base material after the formation on the peelable base material.

* * * * *